UNITED STATES PATENT OFFICE.

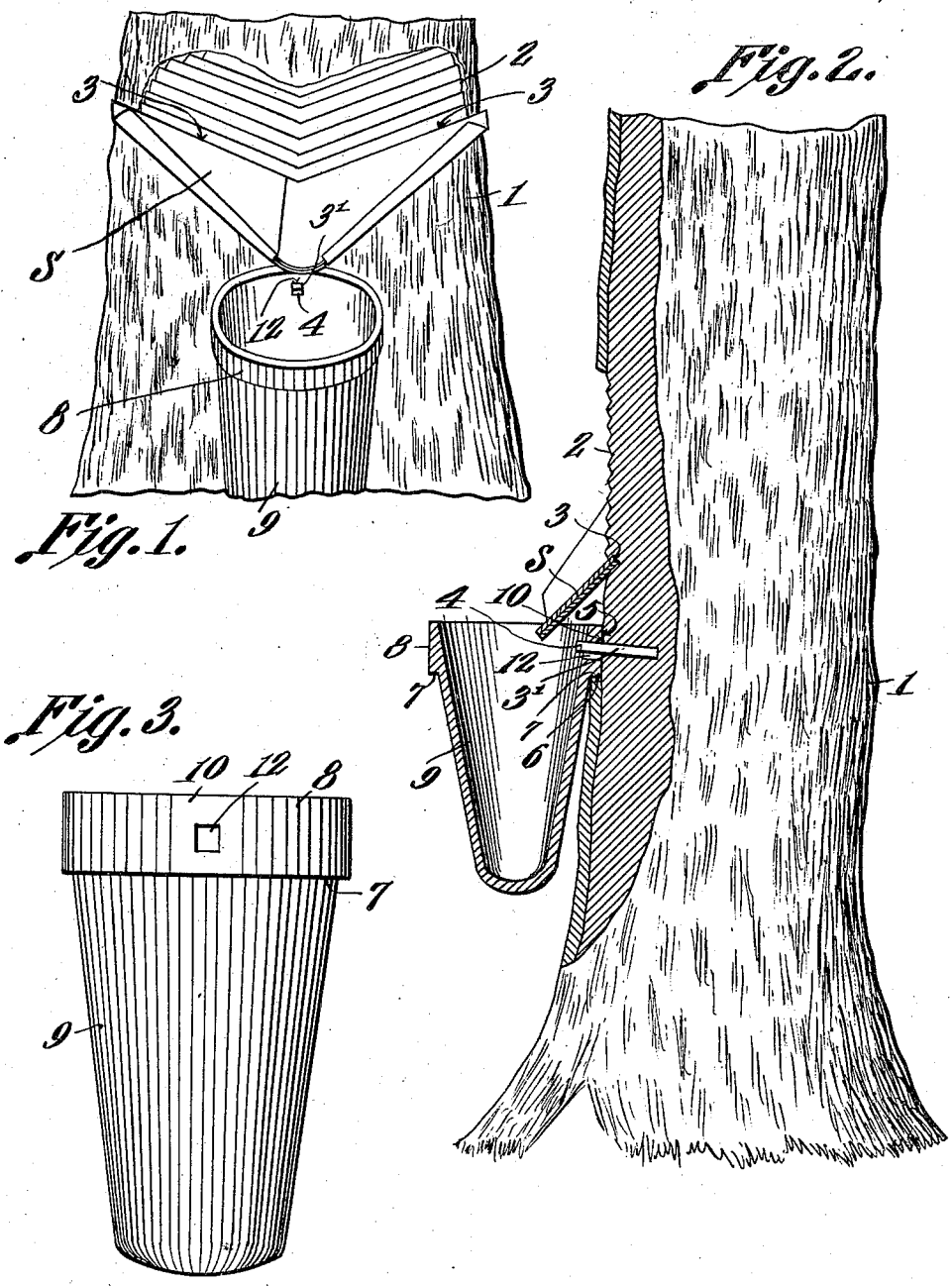

CHARLES L. KRAGER, OF DAISY, TENNESSEE, ASSIGNOR TO HERTY TURPENTINE CUP COMPANY, OF JACKSONVILLE, FLORIDA.

SAP-CUP AND SUPPORT THEREFOR.

1,044,058.  Specification of Letters Patent.  Patented Nov. 12, 1912.

Original application filed September 1, 1911, Serial No. 647,269. Divided and this application filed December 27, 1911. Serial No. 668,151.

*To all whom it may concern:*

Be it known that I, CHARLES L. KRAGER, a citizen of the United States, residing at Daisy, in the county of Hamilton and State of Tennessee, have invented a new and useful Sap-Cup and Support Therefor, of which the following is a specification.

The present invention relates to improvements in sap cups and supports therefor, this particular structure being a form of cup adapted to be secured to receive the sap from tapped trees, such as turpentine trees, the same being provided with a novel form of supporting means whereby the cup is held in the proper position to receive the sap from any form of drip or conveying device, and preferably to be used in connection with the adjustable spout shown and described in application Serial No. 647,269 filed September 1, 1911, and of which the present application is a division.

In the present instance, the sap cup is preferably made of earthen-ware properly glazed or vitrified, the same having a circumferential rim at the upper edge thereof provided with a flattened portion and a centrally disposed square or rectangular opening, for the reception of a square or rectangular shaped pin which is adapted to be driven into the tapped tree to retain the cup in operable drip relation with respect to the drip spout.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a front elevation of a portion of the tree with a spout and the improved form of sap cup connected in operable relation to the spout. Fig. 2 is a side elevation of the tree, a vertical section being taken through the body of the tree adjacent to the spout and sap cup, through which also a vertical section is taken. Fig. 3 is the rear elevation of a sap cup.

Referring to the drawings, the numeral 1 designates the tree trunk, which to put the present invention into practice is cut as indicated at 2, with the obtuse V-shaped bark incision, and further with the two upwardly inclined V-shaped incisions 3 to receive the adjustable sap conveying spout S. At a convenient distance below the spout S is driven a hard wood peg 3′, which is provided with the squared or rectangular head 4, the body of the tree adjacent the said head being flattened as at 5 with the shouldered portion 6, whereby the under portion 7 of the rim 8 of the sap cup 9 may rest upon the said projection with the flattened portion 10 against the flat portion of the tree trunk about the peg 3. The flattened portion 10 is in reality a projection beyond the circumferential rim 8 and thus provides a flat bearing surface exteriorly about the aperture 12 and greatly assists in retaining the cup in proper receiving position and against wabbling movement due to the wind or the brushing thereagainst of grazing stock. The sap cup rim is provided with the rectangular or square aperture 12 for the reception of the peg 3, as indicated in Figs. 1 and 2, the mouth of the cup being so disposed as to receive the drip from the end of the spout S as clearly illustrated. In providing the square peg and the square aperture for fitting upon the peg, a support for the cup is provided which will prevent any swinging action of the cup which is generally occasioned by the wind or by the contact of grazing cattle or other passing articles.

In providing a hard wood peg driven into the tree, there is no danger or injury to the tree, and at the same time when the tree is cut into saw logs, there is no unobjectionable means to injure the saw in sawing the logs, as is usually the case where nails or metal pegs are employed.

In order that a better gripping surface may be provided so that there will be no danger of the cup slipping from the hand of the party in placing or removing the cup from operable position, the surface of the cup is corrugated.

The shape of the peg and the aperture in combination with the flattened portion of the annular rim of the cup and the flattened portion and shoulder of the tree, combine to hold the cup at all times in the proper sap receiving position with relation to the drip portion of the spout S, thus preventing the waste of the drip, as the cup is rigidly secured and held in place.

What is claimed is:

The combination with a wooden rectangular peg driven into a tree, of a sap cup provided with a flattened portion to abut a tree and with a shouldered portion to coact with a shoulder of a tree, said cup being further provided with a rectangular aperture to fit upon and surround the peg.

In testimony that I claim the foregoing as my own, I have hereto affixed my signature in the presence of two witnesses.

CHARLES L. KRAGER.

Witnesses:
W. A. ALEXANDER,
T. C. SCOTT.